(No Model.)
J. A. CROSS.
TRUCK FOR CONVEYING MATERIAL ON AN ELEVATED TRACK.
No. 270,755. Patented Jan. 16, 1883.
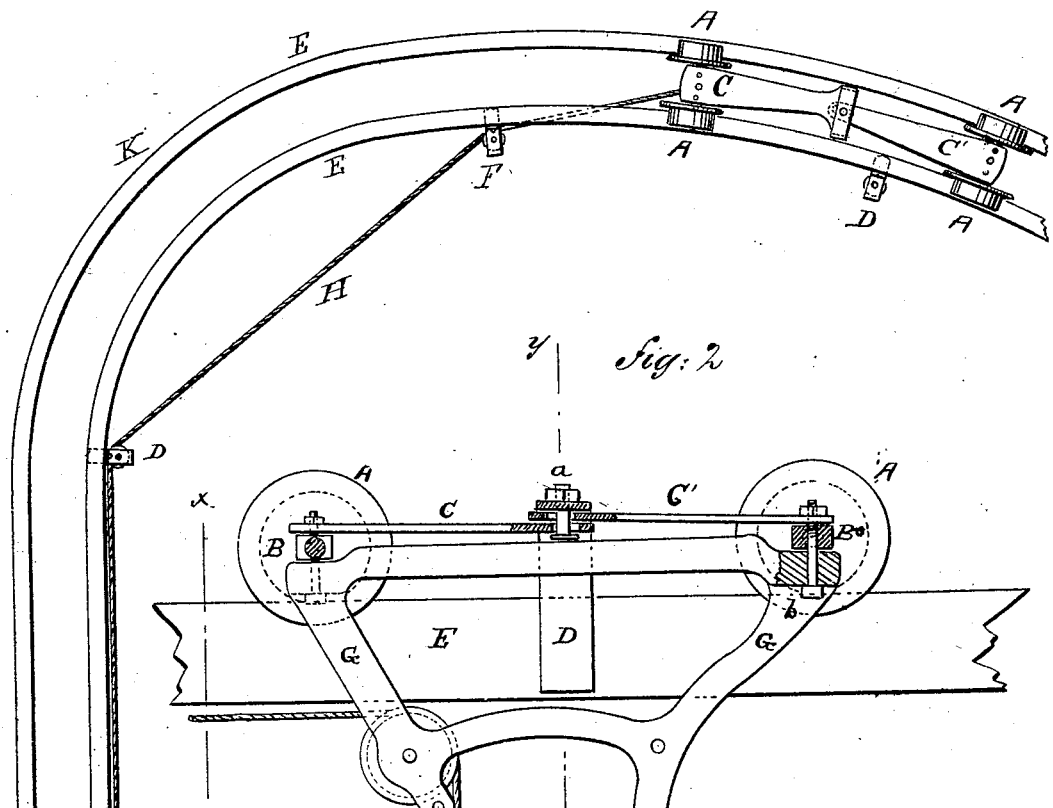
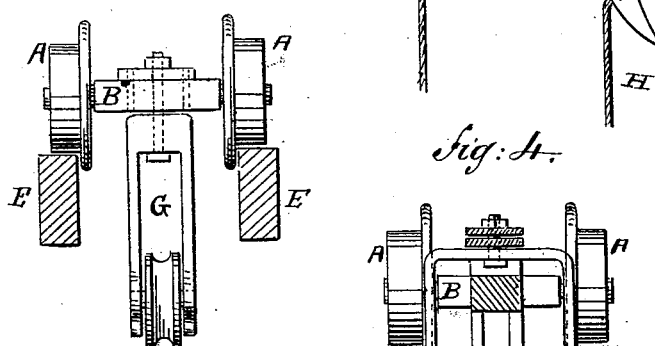
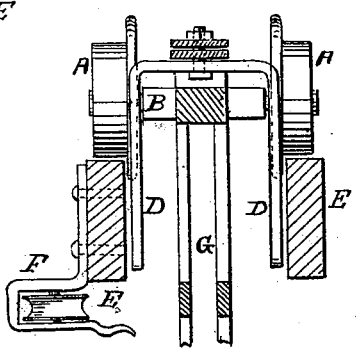
WITNESSES:
INVENTOR

UNITED STATES PATENT OFFICE.

JEROME A. CROSS, OF FULTONVILLE, NEW YORK.

TRUCK FOR CONVEYING MATERIAL ON AN ELEVATED TRACK.

SPECIFICATION forming part of Letters Patent No. 270,755, dated January 16, 1883.

Application filed November 28, 1882. (No model.)

*To all whom it may concern:*

Be it known that I, JEROME A. CROSS, of Fultonville, Montgomery county, State of New York, have invented a new and useful Improvement in a Car or Truck for Conveying Material—Hay, &c.—on an Elevated Track; and I do hereby declare the following to be a full, clear, and exact description of the same, reference being had to the accompanying sheet of drawings, forming part of this specification.

This invention has for its object an improvement in the construction of a car or truck for conveying material—hay, &c.—on an elevated track; and the invention consists in the car or truck of a hay or other conveyer, provided with a hinge or jointed reach, whereby the conveyer is enabled to travel on tracks of short radius; and the invention also consists in combining with the aforesaid truck or conveyer a series of snatch pulleys or blocks and an operating-cable.

In the accompanying sheet of drawings, Figure 1 represents a plan or top view of my truck or conveyer and a curved track with snatch-blocks and operating-cable. Fig. 2 is a side elevation, partly in section, of my truck or conveyer and the conveyer-frame suspended thereon. Fig. 3 is a cross-section taken in line $xx$, Fig. 2. Fig. 4 is a cross-section taken in line $yy$, Fig. 2.

Similar letters of reference indicate like parts in the several figures.

Heretofore in the construction of conveyers for hay and other material it has been found inexpedient to employ tracks with curves of short radius, so that the application of such conveyers to some extent has been limited to either straight tracks or tracks having curves of large radius, thereby restricting the usefulness of the device and confining its application within comparatively narrow limits. To make its use more general, and to obviate the difficulties heretofore attending or preventing its general use and application, I construct my truck or conveyer with its flanged wheels A suitably secured to axles B. These axles B of each pair of wheels are united by means of two reach-bars, C C', which bars are pivoted together at their inner ends, as at $a$, Fig. 2. To the reach-bar C are firmly fixed arms D, which extend downward at right angles to the reach-bar C', and pass between and near the inner sides of the rails E of the track on which the truck is placed, as is shown in Fig. 4. To the inner sides of the rails E, in a convenient position, are fixed snatch blocks or pulleys F, and from the axles B of the truck is suitably suspended the frame G of the conveyer, to which frame is fixed an operating or draw rope, H, to which is suspended the load that is to be conveyed.

When my conveyer is constructed substantially as described it is operated by the draw-rope H, attached to a windlass or horse, or otherwise, and the truck travels on the track in the direction in which it is drawn, if the track be straight, as an ordinary truck would travel; but as soon as the truck reaches that part of the track, as at K, Fig. 1, which is a curve with a short radius, the arms D, following the curve of the rails or track, cause the reach-bars C and C' to turn on their pivot $a$, so that the axles B and wheels A can move around the curve without hindrance from the other, or as freely as they would do if they were not connected by a reach, but were simply a single pair of wheels. When the truck has passed the curve the arms D, still following the direction of the track, cause the axles and wheels to again travel in a straight direction. The frame G of the conveyer, being suspended beneath the axles B by bolts $b$, permits this frame to assume each direction that the truck takes in its travels over the track.

Since it is necessary on a track curved as described that the power which draws the truck should be in a direction corresponding with that which the truck is to travel, snatch-blocks F are bolted to the inner rail of the track at such distances apart as will cause the draw-rope H to follow to some extent the curves of the track, whether straight or curved, so that the force or power applied to the truck will be substantially parallel to the curves of the track, and not at a tangent to it, which would result in throwing the truck from the rails. The load, being suspended to the frame G in the manner shown and described in Letters Patent granted to me on the 19th day of December, 1876, or in any other desirable manner, is, by means of the truck and track before mentioned, readily conveyed from place to place, however curved or irregular the track to that place may be.

Having now described my invention, what I claim as new, and desire to secure by Letters Patent, is—

1. A conveyer-truck constructed with two reach-bars, C and C', pivoted together at their inner ends, in combination with arms D, as and for the purpose described.

2. In combination with a conveyer-truck with pivoted reach-bars and arms D, a curved railroad, for the purpose described.

3. In combination with a conveyer-truck with pivoted reach-bars and arms D, a conveyer-frame, G, suspended from the axles of the truck by yielding joints, as and for the purpose described.

4. In combination with a conveyer-truck having pivoted reach-bars and arms D, a series of snatch-blocks and draw-rope H, as and for the purpose described.

JEROME A. CROSS.

Witnesses:
WELLINGTON CROSS,
PETER McTAGGART.